United States Patent [19]

Hsu

[11] Patent Number: 5,346,434
[45] Date of Patent: Sep. 13, 1994

[54] REAR DERAILLEUR MECHANISM FOR A BICYCLE

[76] Inventor: Yi-Hsung Hsu, No. 9, Lane 130, Sec. 1, Kwangfu Rd., San Chung City, Taipei Hsien, Taiwan

[21] Appl. No.: 112,803
[22] Filed: Aug. 27, 1993
[51] Int. Cl.$^5$ ............................................. F10H 61/00
[52] U.S. Cl. ..................................................... 474/82
[58] Field of Search ........................................ 474/77–82

[56] References Cited

U.S. PATENT DOCUMENTS

| | | | |
|---|---|---|---|
| 4,241,617 | 12/1980 | Nagano et al. | 474/82 |
| 4,642,072 | 2/1987 | Nagano | 474/82 |
| 4,832,662 | 5/1989 | Nagano | 474/82 X |
| 4,878,884 | 11/1989 | Romano | 474/82 |

Primary Examiner—Thuy M. Bui
Attorney, Agent, or Firm—Nikaido Marmelstein, Murray & Oram

[57] ABSTRACT

An improved bicycle derailleur mechanism generally includes a bracket with two parallel spaced lugs extending perpendicularly therefrom, obliquely positioned on a first pivot member so that an inner cable extending through an adjuster nipple to a cable clamp on a parallelogram body is retained at a same angle when tension in the cable is adjusted by rotating the adjuster nipple, resulting in alignment between the derailleur mechanism and sprockets on a bicycle rear wheel remaining unchanged.

2 Claims, 3 Drawing Sheets

REAR DERAILLEUR MECHANISM FOR A BICYCLE

BACKGROUND OF THE INVENTION

The present invention relates to a rear derailleur mechanism for a bicycle.

A multi-gear bicycle uses a rear derailleur mechanism to shift the chain from one sprocket to an adjacent sprocket so as to enable a rider to go faster or climb hills more easily. Gear selection is made via an inner cable housed in an outer cable both of which extend from a lever positioned on the bicycle near the rider's hands to the rear derailleur mechanism. A first end of the inner cable is secured to the gear lever, a second end of said cable passes through an adjuster nipple fixed to a lug on the derailleur mechanism and is clamped by a cable clamp means to a pivoting portion of the derailleur mechanism. The outer cable has a first end abutting a plate at the gear lever and a second end located within the adjuster nipple. Tension on the inner cable results in its stretching and the adjuster nipple is rotated counter-clockwise to take up the "slack" in the inner cable. However, this action results in misalignment between the derailleur and the sprockets. Thus, there has been a long and unfulfilled need for a rear derailleur mechanism for a bicycle which permits the tension of the inner cable to be adjusted without affecting the alignment between the rear derailleur and the sprockets of the bicycle.

SUMMARY OF THE INVENTION

The present invention is a derailleur mechanism for a bicycle which utilizes a double-lug bracket obliquely positioned on a first pivot means so that an inner cable extending through an adjuster nipple to a cable clamp on the parallelogram body is retained at a same angle when the tension in the cable is adjusted by rotating the adjuster nipple, resulting in alignment between the derailleur mechanism and sprockets on a bicycle rear wheel remaining unchanged.

DETAILED DESCRIPTION OF THE PREFERRED EMBODIMENT

Figure 5:
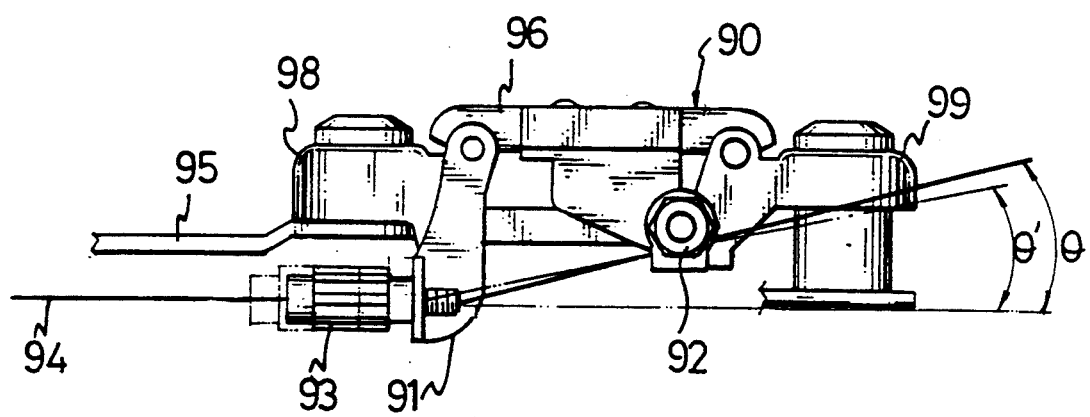
FIG. 5 shows a front elevation of a prior art derailleur mechanism mounted on a bicycle (partly shown).
Figure 4:
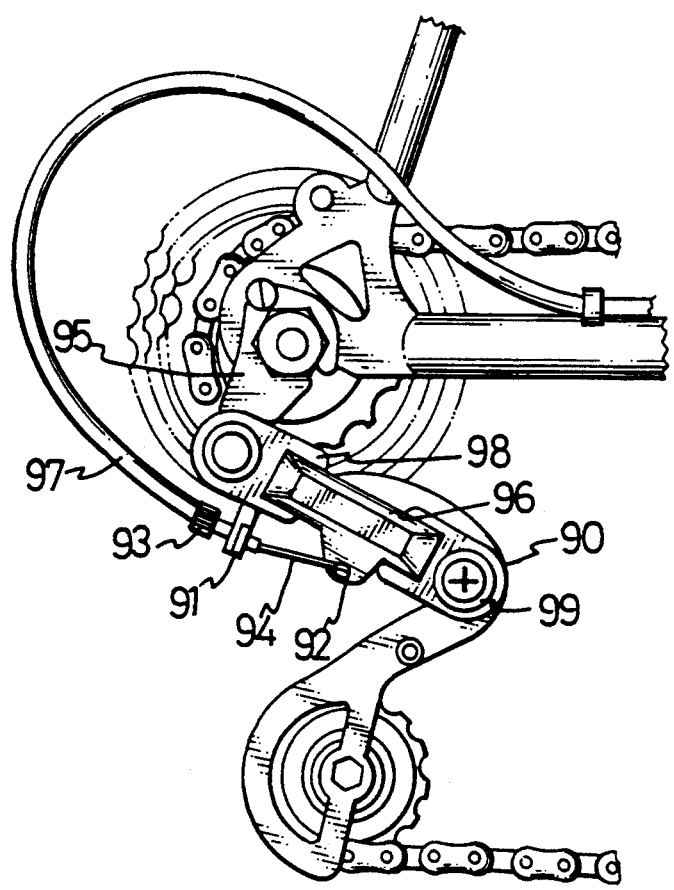
FIG. 4 shows a side elevation of a prior art derailleur mechanism.

Referring to FIGS. 4 and 5, a prior art derailleur mechanism 90 includes a clamp plate 95 a pivotable parallelogram body 96, a bracket 91, a wire clamp means 92, an adjuster nipple 93, an inner cable 94, an outer cable 97, a first pivot means 98 and a second pivot means 99.

The clamp 95 has a first end attached to a bicycle frame and a second end attached to a first pivot means 98. A first end of the pivotable parallelogram 96 is secured to the first pivot means 98 and a second end of the pivotable parallelogram 96 has the second pivot means 99 secured thereto. The bracket 91 has a single lug perpendicularly extending therefrom, and is fixed to the first pivot means 98. The single lug defines a threaded hole therethrough into which the adjuster nipple 93 is threadedly engaged. The wire clamp means 92 is threadedly engaged with the pivotable parallelogram 96. The inner cable 94, partially housed in the outer cable 97, extends from a gear lever (not shown) at the the front of the bicycle, through the adjuster nipple 93 and is clamped to the pivotable parallelogram 96 by the clamp means 92. The operation of the this prior art derailleur mechanism is described later.

Figure 1:
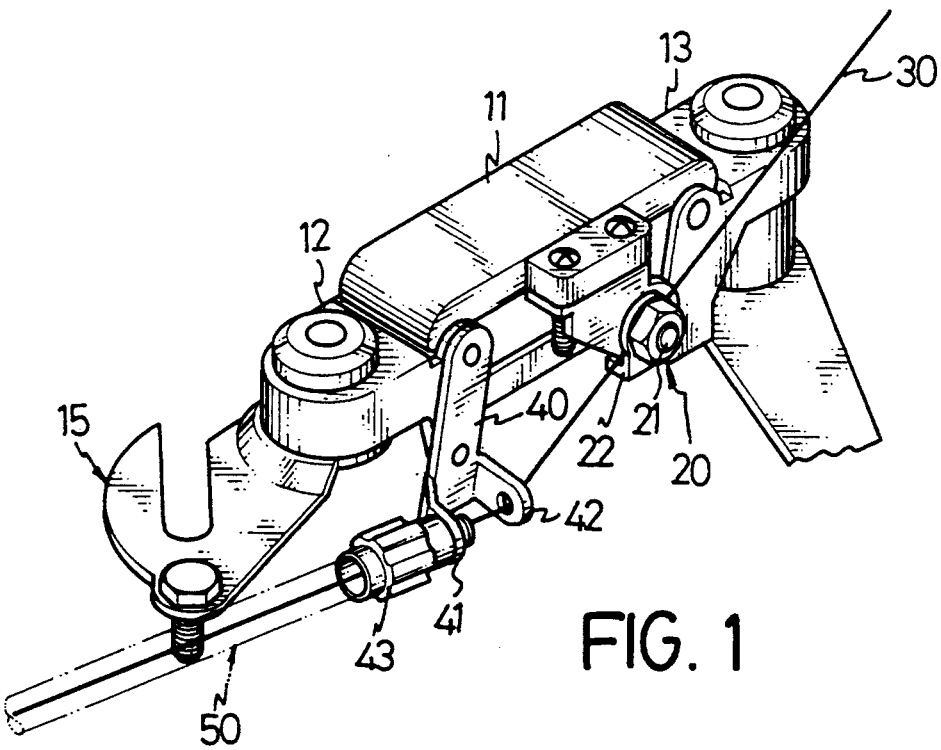
FIG. 1 shows a perspective view of the present invention.

Referring to FIG. 1, an improved rear derailleur mechanism includes a clamp plate 15, a pivotable parallelogram body 11, a first pivot means 12, a second pivot means 13, a bracket 40, a cable clamp means 20, an adjuster nipple 43, an inner cable 30 and an outer cable 50.

Figure 2:
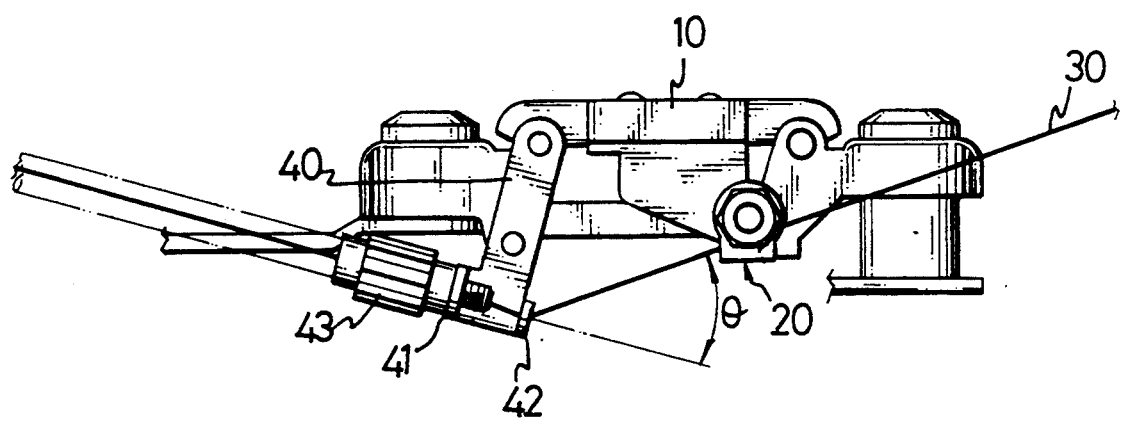
FIGS. 2 shows a side elevation of the present invention in a first position.

Further referring to FIG. 2, the clamp plate 15 is clamped to a bicycle frame (not shown) by means of a screw (not numbered) and a nut (not shown). The first pivotable means 12 is pivotably attached to the clamp plate 15. The first end of the pivotable parallelogram body 11 is secured to the first pivotable means 12 and a second end of the pivotable parallelogram body 11 secured to the second pivot means 13. A sprung arm with two idler wheels is attached to the second pivot means 13 but is not within the scope of this application and will not be described in detail herein The bracket 40 has two parallel spaced lugs 41, 42 extending perpendicularly therefrom and is obliquely secured to the first pivot means 12. A first lug 41 of the bracket 40 defines a threaded through-hole 411. A second lug of the bracket 40 defines a plain hole 421. The threaded adjuster nipple 43 engages with the threaded hole 411 of the first lug 41. A cable clamp means is threadedly engaged to a lower portion of the pivotable parallelogram body 11. The outer cable 50 extends from a gear change lever (not shown) at the front of the bicycle to a cylindrical recess (not shown) within the adjuster nipple 43. The inner cable 30, housed within the outer cable 50 extends from the gear lever through the adjuster nipple 43 and the plain hole 421 of the second lug 42 to the cable clamp means 20 where it is secured to the pivotable parallelogram body 11. Thus, when the gear lever is moved, tension in the inner cable urges the pivotable parallelogram body to move in a direction parallel to the axis of the bicycle wheel.

Figure 3:
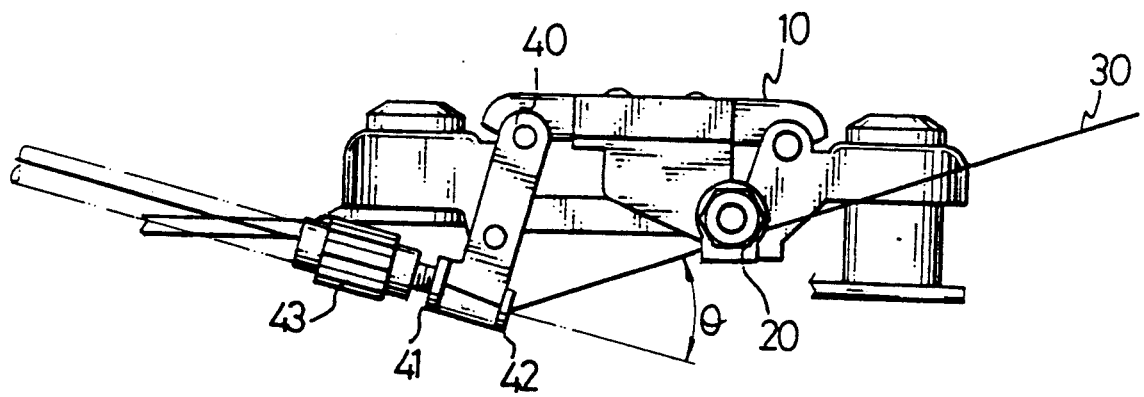
FIG. 3 shows a side elevation of the present invention in a second position.

From FIG. 4, it can be seen that priorly only a single lug was employed on the bracket 91 and that the axis of the adjuster nipple 93 is parallel to the clamp plate. As is shown, as the adjuster nipple is rotated and moved upward to a second position (shown in phantom lines), the angle between the adjuster nipple 43 and the inner cable 94 varies. However, referring to FIGS. 3 and 4, although the adjuster nipple in the present invention is at different positions, the angle between the axis of the adjuster nipple 43 and the inner cable 30 remains the same.

Although the present invention has been explained in relation to its preferred embodiment, it is to be understood that many other possible modifications and variations cab be made without departing from the spirit and the scope of this invention hereinafter claimed.

I claim:

1. A bicycle derailleur mechanism comprising a clamp plate (15), a first pivot means (12) attached thereto, a pivotable parallelogram body (11) received thereon and a second pivot means (13) attached to the pivotable parallelogram body (11), a bracket (40) secured to the first pivot means (12), an adjuster nipple (43) threadedly engaged with the bracket (40) and a cable clamp means (20) secured to the pivotable parallelogram body (11), an inner cable 30 and an outer cable (50), the improvement comprising:

the bracket (40) including two spaced parallel lugs extending perpendicularly therefrom, the first lug (41) defining a threaded hole (411) therethrough and the second lug (42) defining a plain hole (421) therethrough, the adjuster nipple (43) threadedly engaging in the threaded hole (411) of the first lug (41) the inner cable (30) extending through the adjuster nipple (43) and the plain hole (421), to be secured by the clamp means (20) to the pivotable parallelogram body (11), the outer cable (50) locating in a cylindrical recess of the adjuster nipple (43).

2. A bicycle derailleur mechanism according to claim 1 where the bracket (40) is attached obliquely to the first pivot means (12).

* * * * *